No. 750,627.                                      Patented January 26, 1904.

UNITED STATES PATENT OFFICE.

MAX ENGELMANN, OF ELBERFELD, GERMANY, ASSIGNOR TO FARBEN-FABRIKEN OF ELBERFELD CO., OF NEW YORK, N. Y., A CORPORATION OF NEW YORK.

PROCESS OF MAKING DIALKYL BARBITURIC ACID.

SPECIFICATION forming part of Letters Patent No. 750,627, dated January 26, 1904.

Application filed October 23, 1903. Serial No. 178,290. (No specimens.)

*To all whom it may concern:*

Be it known that I, MAX ENGELMANN, doctor of philosophy, chemist, residing at Elberfeld, Germany, (assignor to the FARBENFABRIKEN OF ELBERFELD CO., of New York,) have invented a new and useful Improvement in Processes of Preparing Dialkyl Barbituric Acids; and I do hereby declare the following to be an exact and clear description of my invention.

My invention relates to a new process for the production of dialkyl barbituric acids, (dialkyl-2-4-6-trioxypyrimidin,) having the following general formula:

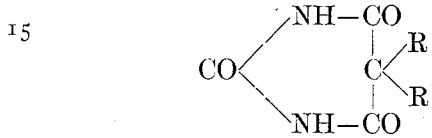

(R meaning alkyl radicals,) which bodies possess valuable therapeutic, especially soporific, properties.

The process for the preparation of these compounds consists in, first, condensing guanidin and dialkyl-cyano-acetic esters of the general formula:

by means of alkali alcoholates, and, secondly, splitting off the two imino groups in 2-4 position from the resulting 5-dialkylated-2-4-diimino-6-oxypyrimidins of the general formula:

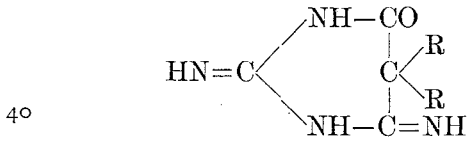

by treatment with acids.

In order to carry out my process practically, I can, for instance, proceed as follows: A solution of ten parts of guanidin hydrochlorid in alcohol is added to a solution of 4.6 parts of sodium in alcohol. The sodium is partly used to set free the guanidin. The sodium chlorid thus precipitated is filtered off, and to the alcoholic solution of free guanidin and sodium ethylate thus obtained seventeen parts of the ethylic ester of diethyl-cyano-acetic acid is added, and the resulting mixture is heated for six hours on the water-bath. After the alcohol is distilled off the syrupy residue is dissolved in water, and from the solution thus obtained the new body, having the melting-point of 295° centigrade, is precipitated by neutralization with hydrochloric acid. A mixture of ten parts of 5-diethyl-2-4-diimino-6-oxypyrimidin thus produced and twenty parts of a fifty-per-cent. sulfuric acid is boiled for five hours in a vessel provided with a reflux condenser. After cooling the reaction mass represents crystals. By a recrystallization from water the diethyl barbituric acid thus produced is obtained in a pure state.

The saponification can also be carried out with other acids.

The process proceeds in an analogous manner for the production of the other dialkyl barbituric acids.

Having now described my invention and in what manner the same is to be performed, what I claim as new, and desire to secure by Letters Patent, is—

1. The process for the production of dialkyl barbituric acids having the above-given general formula, which process consists in first condensing guanidin and dialkyl-cyano-acetic esters by means of alcoholates of alkalies and secondly splitting off the two imino groups in 2-4 position from the resulting 5-dialkyl-2-4-diimino-6-oxypyrimidin by treatment with acids, substantially as hereinbefore described.

2. The process for the production of diethyl-barbituric acid, which process consists in first condensing guanidin and diethyl-cyano-acetic ester by means of alcoholates of alkalies and secondly splitting off the two imino groups in 2-4 position from the resulting 5-diethyl-2-4-diïmino-6-oxypyrimidin by treatment with acids, substantially as hereinbefore described.

3. The process for the production of diethyl-barbituric acid, which process consists in first condensing guanidin and the ethylic ester of diethyl-cyano-acetic acid by means of sodium ethylate and secondly splitting off the two imino groups in 2-4 position from the resulting 5-diethyl-2-4 diïmino-6-oxypyrimidin by treatment with hot sulfuric acid, substantially as hereinbefore described.

In testimony whereof I have signed my name in the presence of two subscribing witnesses.

MAX ENGELMANN.

Witnesses:
OTTO KÖNIG,
JOSEPH LANGE.